US006821206B1

United States Patent
Ishida et al.

(10) Patent No.: US 6,821,206 B1
(45) Date of Patent: Nov. 23, 2004

(54) GAME MACHINE, GAME ROUTE SELECTION METHOD, AND INFORMATION STORAGE MEDIUM

(75) Inventors: Hideyuki Ishida, Tokyo (JP); Akio Ueyama, Tokyo (JP); Masanori Katoh, Tokyo (JP)

(73) Assignee: Namco Ltd., Tokyo (JP)

( * ) Notice: Subject to any disclaimer, the term of this patent is extended or adjusted under 35 U.S.C. 154(b) by 155 days.

(21) Appl. No.: 09/716,079

(22) Filed: Nov. 17, 2000

(30) Foreign Application Priority Data

Nov. 25, 1999 (JP) .......................... 11-334877

(51) Int. Cl.[7] .................. A63F 13/00; A63F 9/24; G06F 17/00; G06F 19/00
(52) U.S. Cl. .................. 463/43; 463/1; 463/31; 463/37; 463/50; 463/51; 463/56; 345/419; 345/427; 434/27; 434/44
(58) Field of Search .................. 463/1–9, 31, 43, 463/49–57, 36–39, 44; 345/419, 427; 434/1–76; 273/153 R, 148 B

(56) References Cited

U.S. PATENT DOCUMENTS 5,707,288 A * 1/1998 Stephens .................. 463/33
5,795,224 A * 8/1998 Yoshida .................. 463/2
6,217,446 B1 * 4/2001 Sanbongi et al. .......... 463/7
6,331,146 B1 * 12/2001 Miyamoto et al. ......... 463/32

FOREIGN PATENT DOCUMENTS

JP 9-47577 2/1997 .................. 463/7

OTHER PUBLICATIONS

Rail Chase 2[online]. Dec. 31, 1996[retrieved on Sep. 04, 2002]. Retrieved from the Internet: URL: www.klov.com/R/Rail_Chase_2.html.*

* cited by examiner

Primary Examiner—John M. Hotaling, II
Assistant Examiner—Robert Mendoza
(74) Attorney, Agent, or Firm—Dellett & Walters

(57) ABSTRACT

There are disclosed a game machine, game route selection method and information storage medium that in case where a plurality of performance positions in a three-dimensional space where a game performance corresponding to a player's operation instruction is performed, and a plurality of moving routes interconnecting the plurality of performance positions are set, the game machine displays predetermined option images for selecting the moving routes where the viewpoint can next move in the performance positions, and allows any one of these option images to be selected by a pointing device.

6 Claims, 15 Drawing Sheets

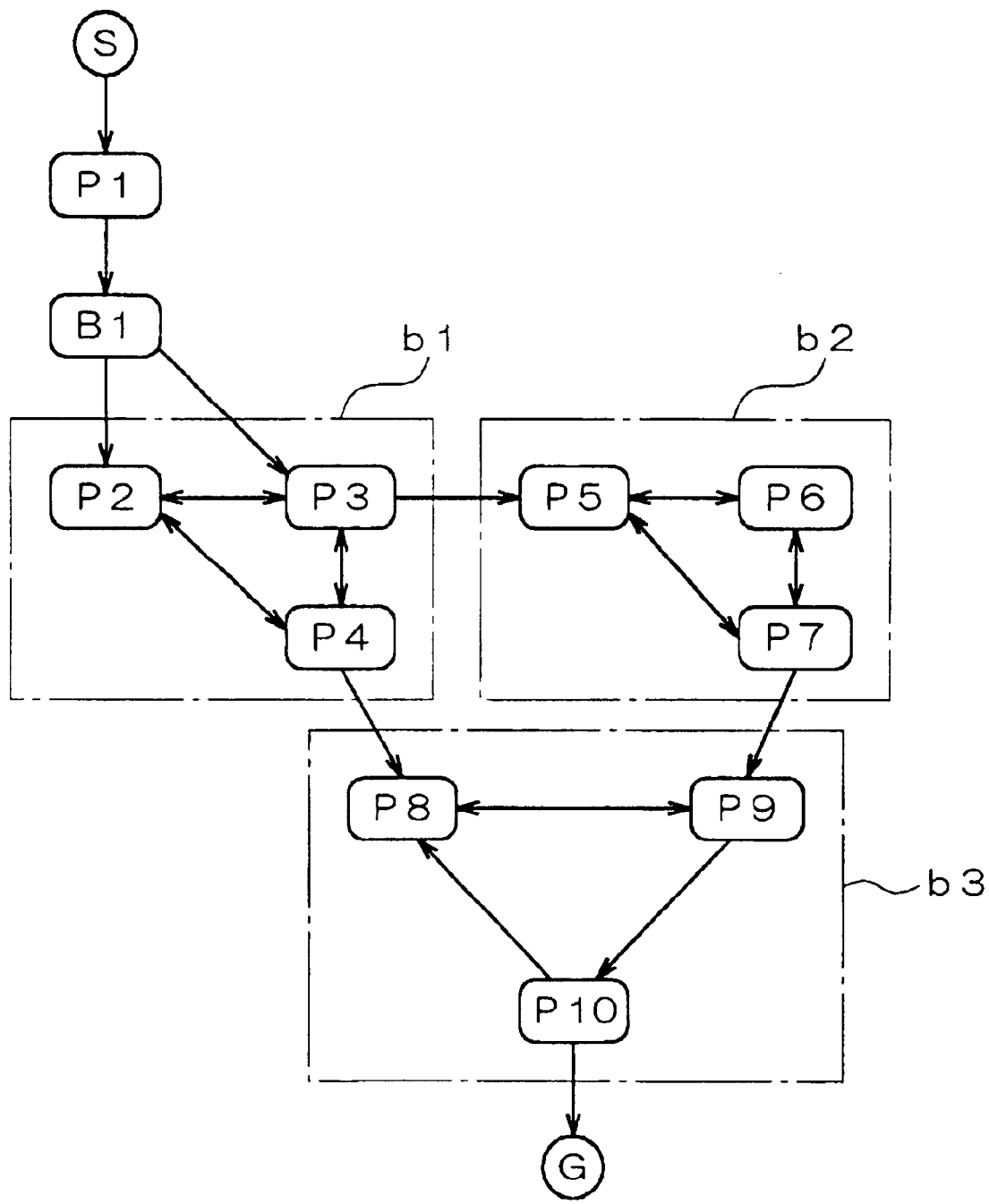
F/G. 16

GAME MACHINE, GAME ROUTE SELECTION METHOD, AND INFORMATION STORAGE MEDIUM

BACKGROUND OF THE INVENTION

The present invention relates to a game machine, a game route selection method and an information storage medium for moving a viewpoint corresponding to a player along a predetermined moving route.

Up to now, home video game machines and game machines installed in amusement centers, shooting games, in each of which a player shoots an enemy character displayed on a screen with using a gun-type controller, are known. Such a shooting game is devised so that a player can enjoy game contents just by performing such simple operation that the player takes a sight at an enemy character, appearing successively on a screen, and pulls a trigger. For example, a viewpoint, corresponding to a player, simply moves along a moving route determined beforehand, and hence it is planned that the player himself/herself need not changes a viewpoint by operating a control lever and the like. In addition, if one or a plurality of branch points are set for achieving a change in the game contents, according to a score at the time when reaching each branch point or an achievement degree of other condition (for example, whether the player could protect citizens from an enemy's attack), there is a case that a traveling direction is changed automatically, or a case that paths join again at need after branch.

Furthermore, besides the above-described shooting game, there are games in each of which a player can freely move a viewpoint corresponding to the player within a predetermined range in a game space by the player operating a control lever, a handle, or the like. Nevertheless, in general, in such a game, a moving method of a viewpoint also is frequently a factor for amusing a player for game contents. For example, there are driving games in each of which a player runs a vehicle along a predetermined course with operating a handle, and games in each of which a player attacks enemy's tanks, airplanes or facilities with moving a player's tank or airplane by operating a control lever. Nevertheless, operating methods of these games are different from those of the above-described shooting games for enjoying only shooting contents. In particular, as described above, in such a shooting game that amuses a player for shooting contents, a viewpoint automatically travels along a predetermined moving route so that a player need not pay attention to movement operation and the like.

By the way, in each of the above-described conventional shooting game, a viewpoint corresponding to a player just automatically moves along a predetermined moving route. Hence, there is a problem that player's intention is not reflected about the moving route, and hence the game contents become uniform. For example, if a player's score is almost the same every time until the player reaches a branch point and a viewpoint always moves just along the same moving route, a background also becomes the same every time. Hence, since the game lacks in variation, the player gets tired of the game contents themselves.

Moreover, in each of the above-described conventional shooting games, even if there is a branch or confluence, the game just progresses toward a destination at a predetermined pace. Accordingly, it is not possible to return to a place having been already passed, and hence there is a problem that the game contents become monotonous. In order to avoid such monotony of a game, it may be a sufficient condition for a player to be able to freely move in a space like a driving game. However, if the player operates a handle or a control lever with operating a gun-type controller, operation becomes complicated, and hence the interest of the game is dampened. In addition, in each of the above-described shooting games, a specific event occurs when the player reaches a predetermined position on a moving route. Hence, if it is made for the player to be able to freely move with player's operation, conditions and the like for generating the specific event become complicated and a processing load increases.

SUMMARY OF THE INVENTION

The present invention has been created in consideration of such circumstances, and its object is to provide a game machine, a game route selection method, and an information storage medium for making it possible to change game contents with simple operation even if a moving route is set beforehand.

In a game machine and a game route selection method of the present invention, a moving route is set so as to interconnect a plurality of performance positions in a three-dimensional space. When a viewpoint corresponding to a player is moved along this moving route by movement processing unit, in each performance position, option images for selecting a moving route to which a player can transfer next are displayed by selection image display unit, and the player selects any one of these option images, which are displayed, by a pointing device. When not only various kinds of game performance is performed in a plurality of performance positions, but also a viewpoint moves along a moving route connecting these performance positions, usually, a next moving route is set according to the result in each performance position. Nevertheless, if it is possible like the present invention to freely select a moving route according to player's intention, game contents become various, and interest of game can be increased. In addition, the player himself/herself can freely select a moving route in each performance position set in a three-dimensional space and it is possible to give variations on game progress. Furthermore, the selection of a moving route can be performed by selecting option images displayed on a display screen with using a pointing device. Hence, a player can select a moving route by the pointing device used in shooting operation in shooting games and the like, and hence it is possible to simplify operation in comparison to a case that the player performs various command inputs with combining other control devices.

Moreover, it is desirable that a moving route leading to the above-described performance position includes a first moving route where only the movement in a single direction is permitted, and a second moving route where bi-directional movement is permitted, and selection image display unit displays the above-described option images in regard to a performance position corresponding to the second moving route in these routes. Since it becomes possible to make a view point come and go along the second moving route by appropriately selecting the option image displayed with corresponding to such a performance position, it is possible to enjoy the game contents at the same performance position.

Moreover, it is desirable that a moving route leading to the above-described performance position includes a third moving route which is set to be able to circularly come and go between respective performance positions, and selection image display unit displays the above-described option images in regard to a performance position corresponding to the third moving route. Since it becomes possible to make a viewpoint circularly move along the third moving route by appropriately selecting the option images displayed with corresponding to such a performance position, it is possible to enjoy the game contents at the same performance position.

In addition, in the above-described performance position, if shooting calculation for battling with a virtual enemy with using a pointing device is performed by game directing unit, it is desirable to display the option images by selection image display unit under the condition of not being attacked from the virtual enemy. Since the player need not perform the selection of a moving route in battle with the virtual enemy, it is possible to prevent a selecting action from becoming complicated. Furthermore, since the game directing unit need not execute the game calculation in battle and the selection determination of an option image at the same time, it is possible to prevent a processing load from increasing.

Furthermore, it is desirable that the above-described game directing unit does not executes bullet-hit determination for a bullet, fired from the virtual enemy, during movement of the viewpoint along a moving route. Since the processing of moving a viewpoint along a moving route is automatically executed by movement processing unit, it is not possible to avoid a bullet and the like by player's operation. Therefore, since the game lacks interest if the player is hit with the bullet and the like in this timing, it is possible to avoid this inconvenience by not executing the bullet-hit determination.

Moreover, it is desirable that the above-described option image has a shape of suggesting a moving direction of a viewpoint in a three-dimensional space. Since a player himself/herself can determine the moving direction, which is advantageous to game development, by showing the moving direction with using a triangular mark, an arrow, or the like, the player can select a moving route for enjoying the game development that the player aims, and it is possible to give variations on game contents.

In addition, it is desirable that the above-described option image is displayed in a manner that the degree of difficulty corresponding to a performance position of the next movement destination can be identified. When the player selects a moving route, the player can take a degree of difficulty into account, and hence the player can enjoy the game contents that are fitted to his/her capability.

Furthermore, it is desirable that, with using a gun-type controller as the above-described pointing device, the player selects the option image corresponding to an aiming position at the time of pulling a trigger provided in this gun-type controller. Since the gun-type controller can appoint a position on a display screen with the simple operation of pulling a trigger, operability can be increased in comparison to a case of selecting an option image with combining other operation unit. In particular, in a shooting game, it is possible to instruct bullet-firing, the selection of an option image, or the like by the operation of simply pulling a trigger with using a gun-type controller. Hence, since operational contents are simplified, it is possible to realize a game that anybody can enjoy.

Moreover, an information storage medium of the present invention includes a program that sets a plurality of performance positions in a three-dimensional space where game performance corresponding to player's instruction is performed and a plurality of moving routes interconnecting a plurality of performance positions and moves a viewpoint, corresponding to a player along a moving route, a program that displays predetermined option images, corresponding to the moving routes where the processing can move next, in a performance position, and a program that selects this specified option image when any one of these option images displayed is selected by a pointing device. It is possible to perform various kinds of game performance in a plurality of performance positions by executing the programs recorded in this information storage medium, and to freely select a moving route according to player's intention in case a viewpoint moves along a moving route connecting these performance positions. Therefore, game contents become various, and the interest of game can be increased. In addition, an option image is displayed in an each performance position, and a player herself/himself can freely select the moving route to which the player wants to progress with using a pointing device, and hence it is possible to give variations on game progress. Furthermore, a player can select a moving route by a pointing device used in shooting operation in shooting games and the like, and hence it is possible to simplify operation in comparison to a case that the player performs various command inputs with combining other control devices.

BRIEF DESCRIPTION OF THE DRAWINGS

FIG. 16 is an explanatory diagram showing an example of a moving route of a game executed by the game machine according to the embodiment.

DESCRIPTION OF THE PREFERRED EMBODIMENT

With reference now to the attached drawings, an embodiment of the present invention will be explained in detail below.

Figure 1:
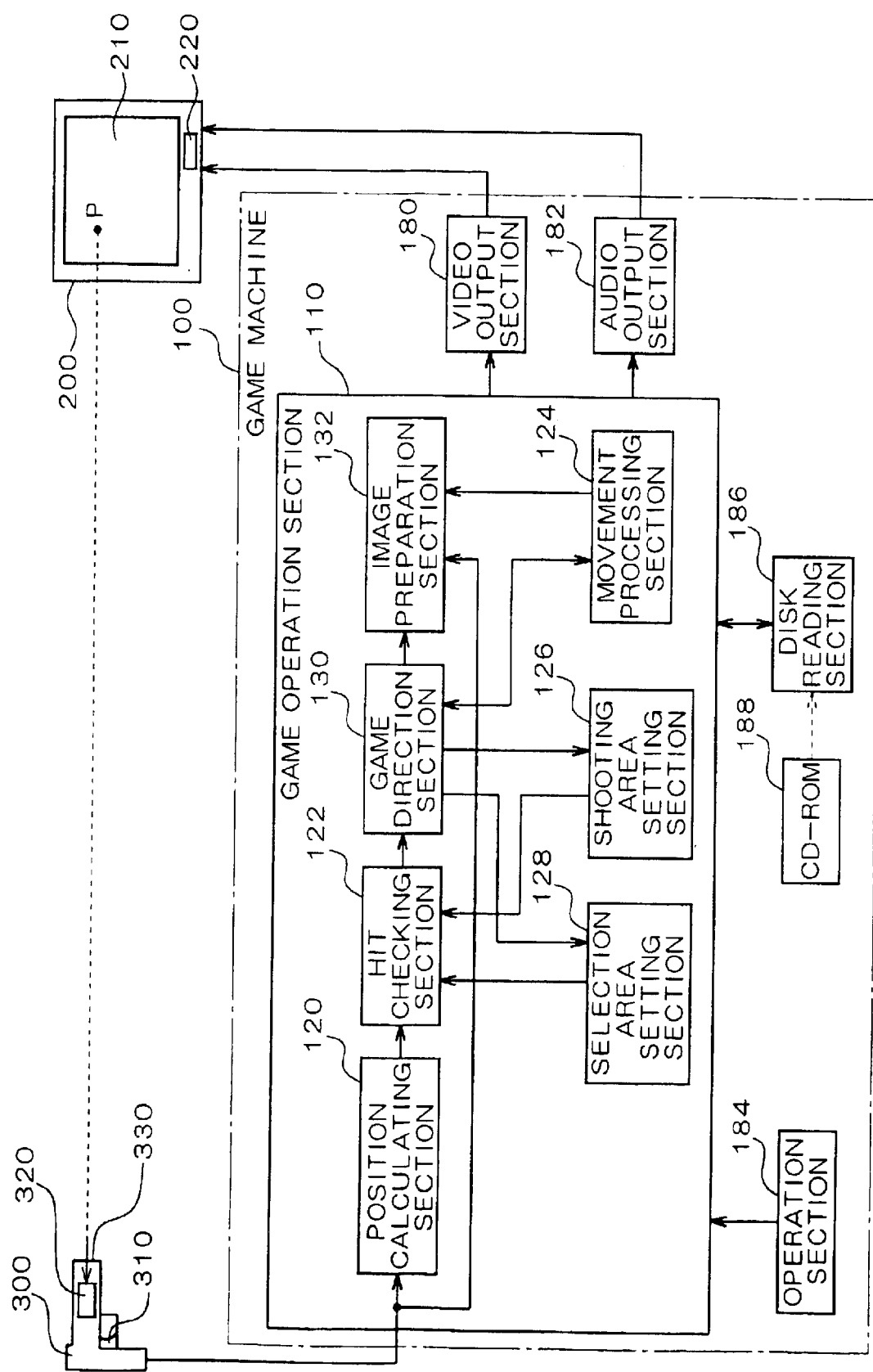
FIG. 1 is a block diagram showing the configuration of a game machine according to an embodiment.
Figure 2:
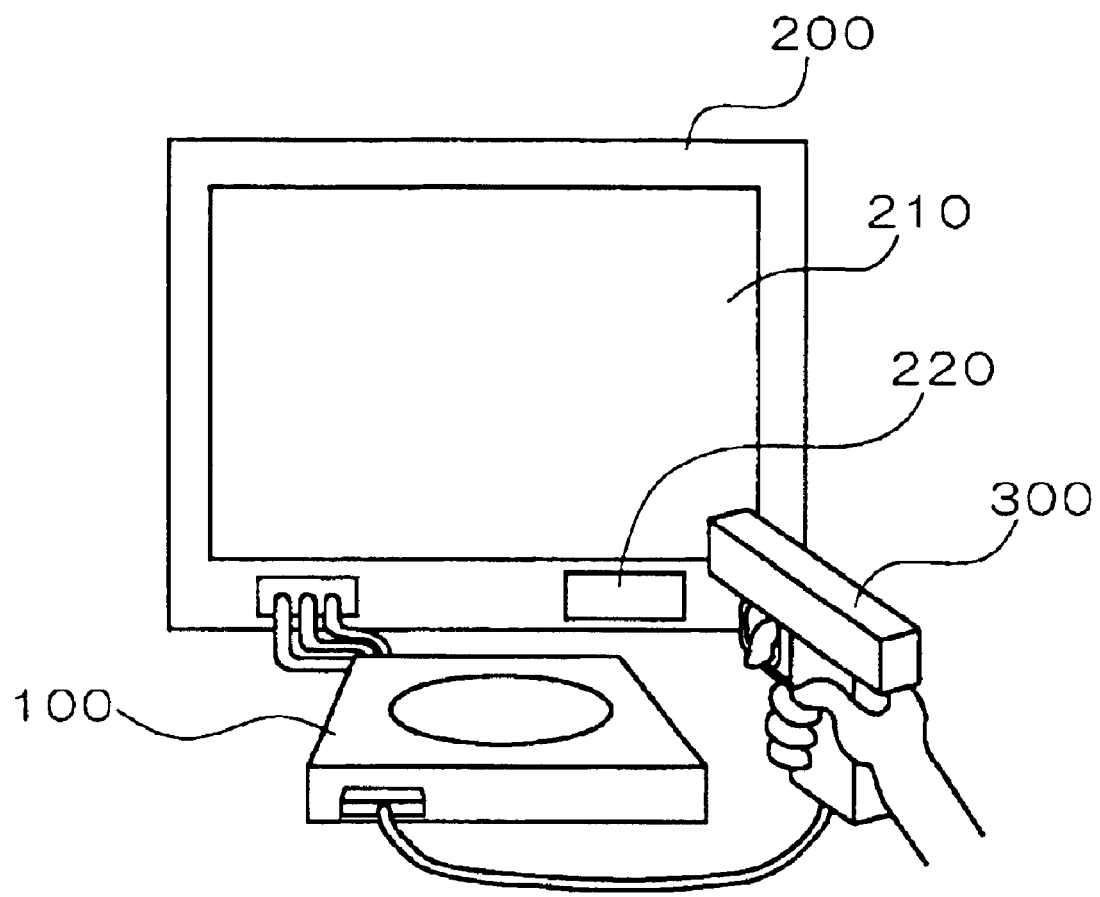
FIG. 2 is a schematic diagram showing a connection state of the game machine according to this embodiment and peripheral devices.

FIG. 1 is a block diagram showing a configuration of the game machine according to this embodiment. FIG. 2 is a schematic diagram showing a connection state of the game machine according to this embodiment and peripheral devices. This embodiment will explain a game machine for home use as an example.

As shown in FIG. 1 and FIG. 2, the game machine of this embodiment is configured by a game machine 100 that performs predetermined game operations by executing a game program stored in a CD-ROM as an information storage medium and outputs image signals of game images and voice signals such as various effect sounds, a television monitor device 200 connected to this game machine 100 and a gun-type controller 300 specifying an arbitrary position on a display screen of the television monitor device 200.

The television monitor device 200 is equipped with a display 210 that displays a game image on a display screen based on an image signal input from the game machine 100 and a speaker 220 that converts a voice signal input from the game machine 100 to voice and emits it into the air. The display 210 is a raster scan type display, and is composed of, for example, a CRT (cathode ray tube).

The gun-type controller 300 comprises a trigger 310 that is operated in order to specify and take in an aiming position on a display screen of the display 210, and a photoreceiver 320 detecting brightness in an aiming position on this display screen. Since the raster scan typed display 210 performs display by predetermined scan, the time when a point on the display screen corresponding to an aiming position brightens is different in a horizontal position and a vertical position of the aiming position even if an entire display screen brightens simultaneously. The photoreceiver 320 detects only a beam emitted from the aiming position designated on the display screen arbitrarily using the gun-type controller 300. By clocking time from pulling the trigger to detecting the beam by the photoreceiver 320, it is possible to know the time which it takes from beginning of the scanning to the arrival of the scan position to the aiming position. Based on this time, it is possible to obtain the horizontal position and vertical position in the display screen on the basis of this information. Usually, the detection of the aiming position that uses the gun-type controller 300 is performed when a certain game scene is displayed on the display screen. Therefore, since light quantity is set so that light quantity at the time of brightening the entire display screen becomes more than light quantity in a usual game scene, the photoreceiver 320 does not react to the usual game scene.

The game machine 100 is provided with a game operation section 110, a video output section 180, an audio output section 182, an operation section 184 and a disk reading section 186. The game operation section 110 performs various game operations by executing a game program using, for example, a CPU, ROM and RAM. A detailed configuration of this game operation section 110 will be explained later.

The video output section 180 is configured by including a VRAM and reads image data, which is generated by the game operation section 110 and stored in the VRAM in order of scanning, converts the image data to an NTSC signal and outputs a video signal to the display 210 of the television monitor device 200. The audio output section 182 converts various voice data output from the game operation section 110 to an analog voice signal and outputs the analog voice signal to the speaker 220 included in the television monitor device 200.

The operation section 184 is for the player to input various commands to the game machine 100. Since the designation of an arbitrary position on the display screen is performed with using the above-described gun-type controller 300, and therefore suppose, for example, a power switch and reset switch, etc. in this embodiment are included in the operation section 184.

The disk reading section 186 is used to read various data stored in the CD-ROM 188 inserted. The CD-ROM 188 stores a game program including image data necessary to provide high-resolution graphic display and the disk reading section 186 sends the game program read from the CD-ROM 188 to the game operation section 110.

In addition, the game operation section 110 comprises a position calculating section 120, a hit checking section 122, a movement processing section 124, a shooting area setting section 126, a selection area setting section 128, a game direction section 130, and an image preparation section 132.

The position calculating section 120 calculates an aiming position P on the display screen on the basis of the time from a first pulse signal being outputted after the trigger 310 of the gun-type controller 300 is pulled to a second pulse signal being outputted after a beam emitted from the aiming position P on a display screen of display 210 is detected by the photoreceiver 320. Concretely, if the first pulse signal is outputted from the gun-type controller 300, the image preparation section 132 generates image data that brightens the entire display screen temporarily. Then, an image signal corresponding to this image data is generated by the video output section 180 and sent to the display 210 of the television monitor device 200, and the processing of brightening the entire display screen simultaneously is performed. Nevertheless, as described above, actually, a display screen does not brighten simultaneously, but the raster scan corresponding to one field during 1/60 sec is performed in a general television monitor device 200 where interlace scan is performed. Therefore, depending on an aiming position on the display screen on which a muzzle 330 is aimed, the time until the portion brightening is different. The position calculating section 120 obtains an aiming position on the display screen, on which the muzzle 330 is trained, by calculation on the basis of this principle.

The hit checking section 122 determines whether a virtual bullet or a light beam, which is fired by pulling the trigger 310 of the gun-type controller 300 when the target is displayed on the display screen, hits this target. In addition, the hit checking section 122 actually checks whether an aiming position of the gun-type controller 300 is included in an area corresponding to the target on the display screen and performs the determination of hit if the aiming position is included. Nevertheless, in the following description, it is assumed that the bullet which is fired when the trigger 310 of the gun-type controller 300 is pulled flies toward the display screen and it is determined whether this bullet hits various kinds of targets. AS the targets, at least an enemy character, displayed on the screen display, and the option marks, which are appropriately displayed when a player selects a route to move from now on, are included. The option marks correspond to option images. Concrete examples of them will be described later.

The movement processing section 124 performs the processing of moving a viewpoint corresponding to a player according to a predetermined moving route in connection with the progress of the game. In regard to, for example, a game space as a virtual three-dimensional space, in this embodiment, it is assumed that a moving route of a player's viewpoint in the game space is set beforehand.

The shooting area setting section 126 sets a display area of an enemy character, which becomes a target of the shooting using the gun-type controller 300, as a shooting area. In principle, a display area of the enemy character on the display screen is set as a shooting area as it is. However, if the display area of the enemy character is extremely small, a player can hardly hit this shooting area, and hence game contents becomes uninteresting. In this case, it can be performed to set a range, which is larger than the display area of the enemy character, as an attack area. In addition, if an enemy character having a big or complicated shape is displayed and various game performance is performed depending on a bullet-hit position in the enemy character (for example, a case of making the degree of damage of the enemy character be different according to the bullet-hit position), it can be performed to divide the one enemy character into a plurality of pieces and set a shooting area every divided area.

The selection area setting section 128 sets a selection area for alternatively selecting one moving route among a plurality of moving routes, from which a player can select one route, with using the gun-type controller 300. For example, if such a selection operation becomes effective, option marks corresponding to a number of options are displayed on the display screen and this display range is set as the selection area as it is. However, if dimensions of the option mark displayed are extremely small, it is very difficult to hit this option mark. In this case, it can be performed to set a range, which is larger than the option mark image, as a selection area.

The game direction section 130 directs the game by generating various kinds of events at each specific point which the player passes through when a viewpoint corresponding to the player is moved along a predetermined moving route by the movement processing section 124. For example, the game performance is to generate an event of battling with the player by making an enemy character appear. In addition, the image preparation section 132 generates image data such as an enemy character or a background to be in sight from a viewpoint in each time and the image data of option marks, appropriately displayed, when the viewpoint corresponding to the player moves along a predetermined moving route. For example, by performing perspective projection conversion on the basis of a viewpoint in a game space as a three-dimensional space, two-dimensional image data including an enemy character and option marks is generated.

The above-described gun-type controller 300 corresponds to a pointing device, the game direction section 130 and image preparation section 132 correspond to selection image display unit, the game direction section 130 corresponds to game directing unit, and the movement processing section 124 corresponds to movement processing unit.

Figure 3:
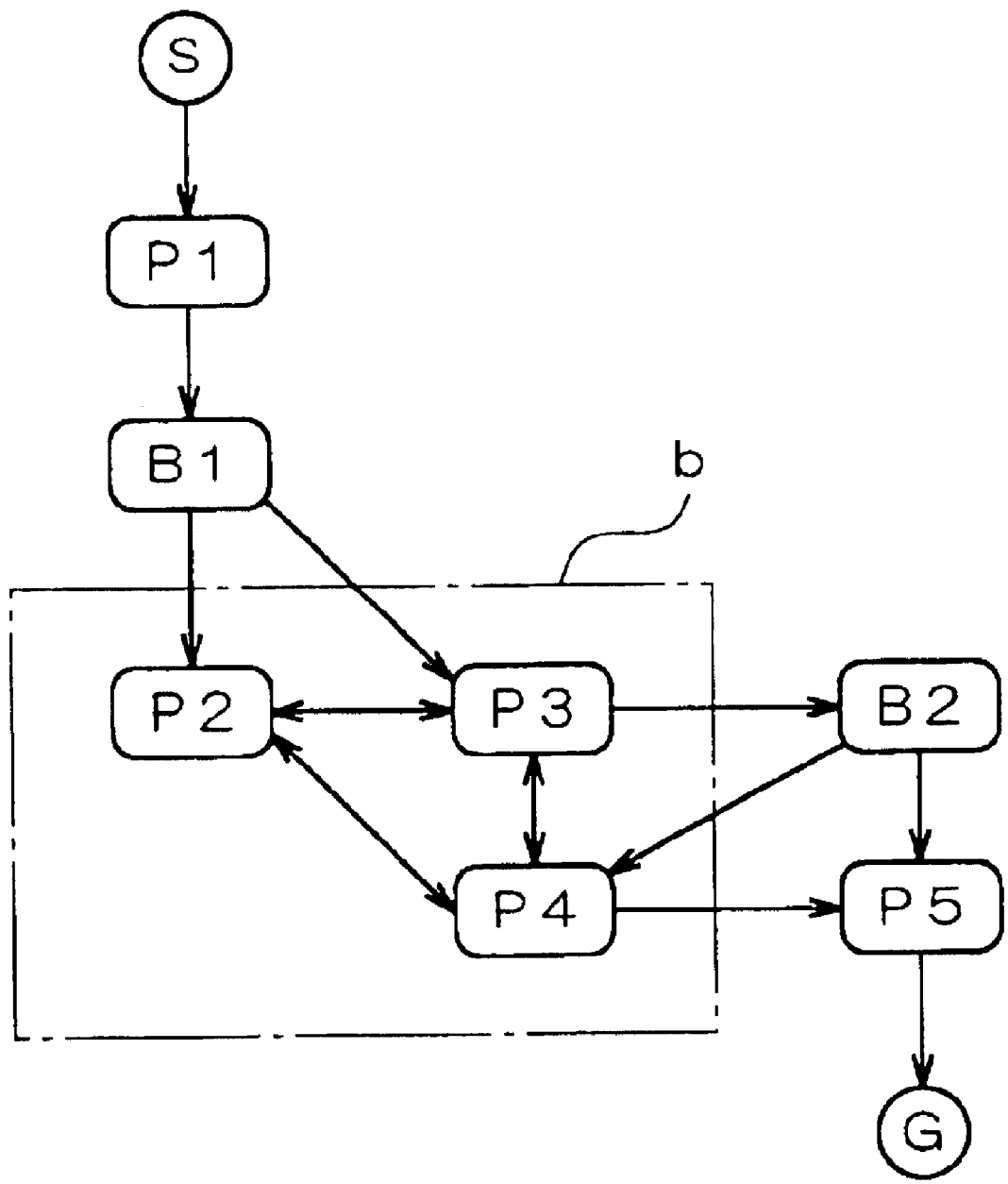
FIG. 3 is an explanatory diagram of a moving route of a game executed by the game machine according to this embodiment.

The game machine according to this embodiment has such configuration, and next, its action will be described. FIG. 3 is an explanatory diagram of a moving route of a shooting game executed by the game machine according to this embodiment. In FIG. 3, reference symbol "S" shows a game start position, and "G" shows a goal position. In addition, reference symbols "P1" to "P5" show the performance positions where a player battles with enemy characters, and "B1" and "B2" show the performance positions where branches merely occurs while a player's viewpoint moves. Furthermore, arrows interconnecting these performance positions show routes where a viewpoint moves in a game space as a three-dimensional space. On this route, a specific event such as a branch or a battle with the enemy character does not occur, but a player's viewpoint merely moves. Hence, nothing happens even if the player pulls the trigger 310 of the gun-type controller 300.

Moreover, a direction of an arrow corresponds to a direction of movement, and hence, if an arrowhead is added to only one edge, it is shown that movement in only one direction is possible. Further, if arrowheads are added to both ends, it is shown that bi-directional movement is possible. The route where movement in only one direction is possible corresponds to the first moving route, and the route where bi-directional movement is possible corresponds to the second moving route.

In a shooting game executed by the game machine according to this embodiment, it is assumed that a player hides himself/herself in a certain structure in order to avoid an attack from an enemy when bullets are loaded in battle. Further, if it is set that a branch occurs in battle, predetermined option marks are displayed during this operation of hiding herself/himself. For example, since the player can select one among two or three moving routes in battle in performance positions P2, P3, and P4, option marks for a player to suggest which moving route is selected are displayed when the player gets under cover in order to load bullets. On the other hand, in performance positions P1 and P5, a corresponding moving route is one in spite of the same state of fighting. Hence, if a subject in this performance position is achieved (for example, when the player defeats all the enemy characters in the battle), the operation of moving a player's viewpoint along this sole moving route is performed.

An area b shown in FIG. 3 shows a block where the player can freely go back and forth between performance positions according to a certain route within the area. In an example shown in FIG. 3, it is possible to come and go bi-directionally among the performance positions P2 to P4. However, it is not always necessary to be able to come and go bi-directionally between performance positions in the block, but it may be also movable circularly in only one direction. If a route that a player can circularly move in only one direction is set, this route corresponds to the third moving route.

Furthermore, in other performance positions B1 and B2, since a plurality of moving routes to which a player can progress next is present, option marks are displayed on the display screen so that the player selects any one of the plurality of moving routes. However, these performance positions merely correspond to a branch position in moving operation in a state of not fighting. Hence, even if the player does not get under cover, option marks are displayed.

Figure 4:
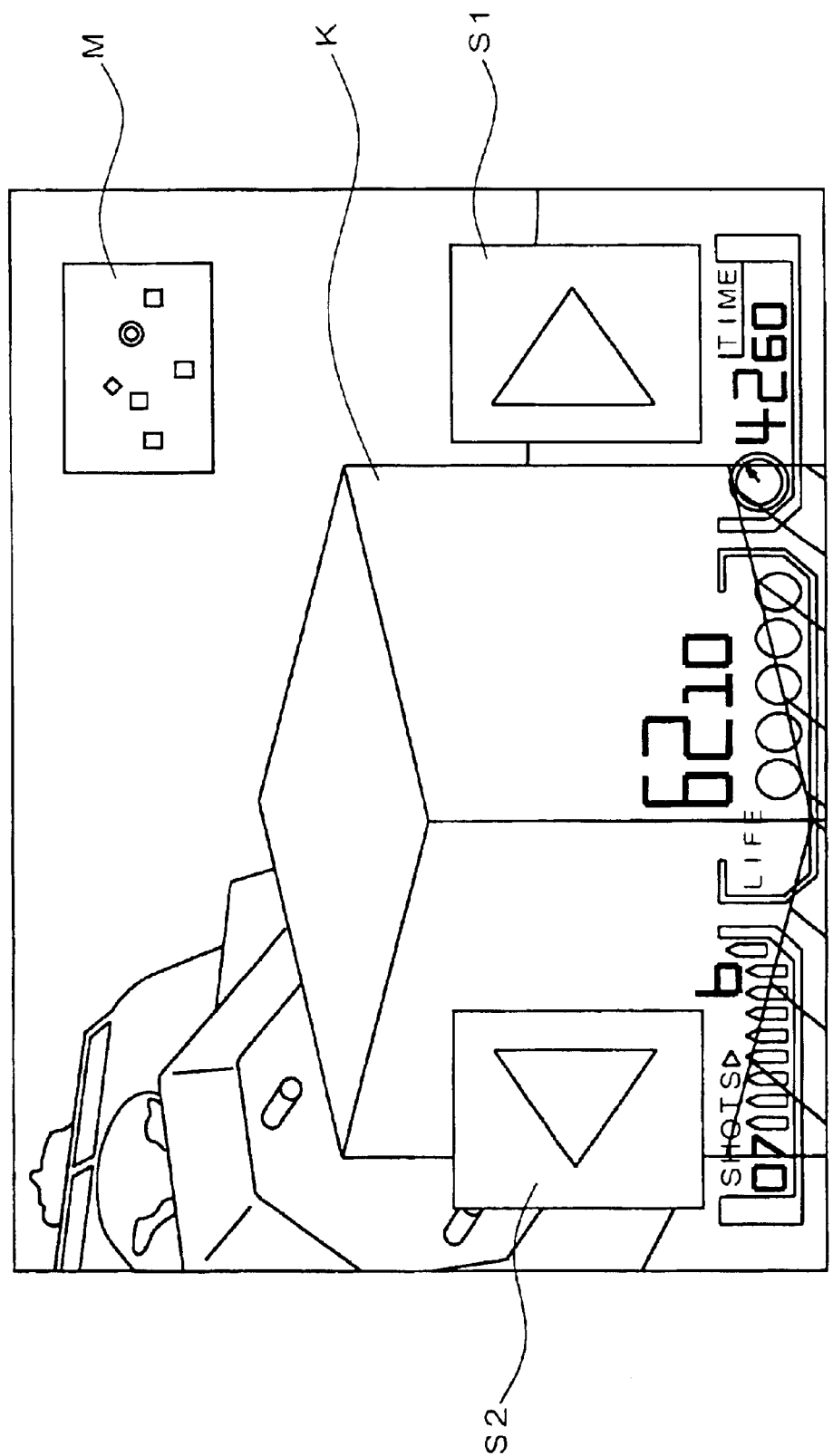
FIG. 4 is a schematic diagram showing a display example of a game screen including options marks.

FIG. 4 is a schematic diagram showing a concrete example of option marks, and shows a display screen when option marks are displayed while a player, for example, loads bullets. Images in each of which a triangle is rendered in each of rectangles which appear in the right and left sides of the display screen shown in FIG. 4 are option marks, and a predetermined vertex of each triangle indicates a direction where the player can move at present. For example, it is shown that a player can move to the right side horizontally by an option mark S1 arranged in the right side of the display screen. Further, it is shown that a player can move to the left side horizontally by another option mark S2 arranged in the left side of the display screen. In addition, a map M showing the layout of the enemy characters and the like which are included in an area that is larger than the display area is displayed in a part of the display screen. The player can use this map as a clue for determining where the player should progress next by referring to this map. In particular, conventionally, since a viewpoint corresponding to a player is fixed in this kind of shooting game, the player need not examine a moving direction that is advantageous to the player. Nevertheless, if the player can select a moving direction from among a plurality of options, the player need determine the moving direction that is advantageous to the player, and hence the above-described map M becomes the effective material for such determination.

In addition, in the performance position P2 in a battle, the timing when the above-described option marks S1 ad S2 are displayed is the timing when the player gets in cover (in the vicinity of a structure K) so that the player loads bullets. Hence, the player can select a desired moving direction without being attacked from an enemy character by adjusting the sight on any one of the option marks S1 and S2 and pulling the trigger.

FIGS. 5 to 9 are flow charts showing operational procedure of the game machine according to this embodiment. A shooting game that is realized by the game machine according to this embodiment has a plurality of operation modes. For example, the shooting game has four operation modes 0 to 3. The "operation mode 0" is an operation mode corresponding to an operating state of moving between performance positions or between each performance position and the start position or goal position, and its operation progresses according to the flowchart shown in FIG. 6. Just after the game start, an operating state is set in this operation mode 0 as initial setting. The "operation mode 1" is an operation mode when a branch occurs in a moving route in case where the viewpoint is moving, and its operation progresses according to the flowchart shown in FIG. 7. Selection operation corresponding to a branch occurs when the viewpoint is moving except a branch occurring in battle is included in this operation mode 1. The "operation mode 2" is an operation mode when a player loads bullets in battle, and its operation progresses according to the flowchart shown in FIG. 8. It is assumed that, in the shooting game according to this embodiment, a character corresponding to a player himself/herself (player character) performs the operation of getting under cover in order to dodge an attack from an enemy character when a player loads bullets in an own gun. Hence the operation mode 2 includes this operating state. The operation of selecting any one of option marks, which are displayed, when a branch occurs in battle with an enemy character is included in this operation mode 2. In addition, selection operation corresponding to a branch occurring in battle is included in this operation mode 2. The "operation mode 3" is an operation mode when a player actually battles with an enemy character, and its operation progresses according to the flowchart shown in FIG. 9. During the operation corresponding to the operation mode 3, such game performance that the player is damaged (given-damage processing) is performed. In the flowchart shown in FIG. 5, transition states between respective operation modes are shown.

Entire operation

When the power switch or reset switch of the operation section 184 is pressed, the game operation section 110 determines whether the game is over (step 101) after performing initialization processing (step 100). For example, at step 100, as an initial condition of operation modes, the "operation mode 0" is set. In addition, at step 101, it is determined whether each stage can be cleared and whether a predetermined amount of damage is given from the enemy character and the like. If the player cannot clear each stage within a predetermined period or the player character is damaged in extent of more than the predetermined amount from the enemy character, affirmative determination is performed by determination processing at the step 101, and predetermined game-over processing is performed by the game operation section 110 (step 102).

If the game is not over, the game direction section 130 determines in order whether the operating state that is set at that time is the "operation mode 0" (step 103), whether the state is the "operation mode 1" (step 104), and whether the state is the "operation mode 2" (step 105).

Operation corresponding to "operation mode 0"

Figure 5:
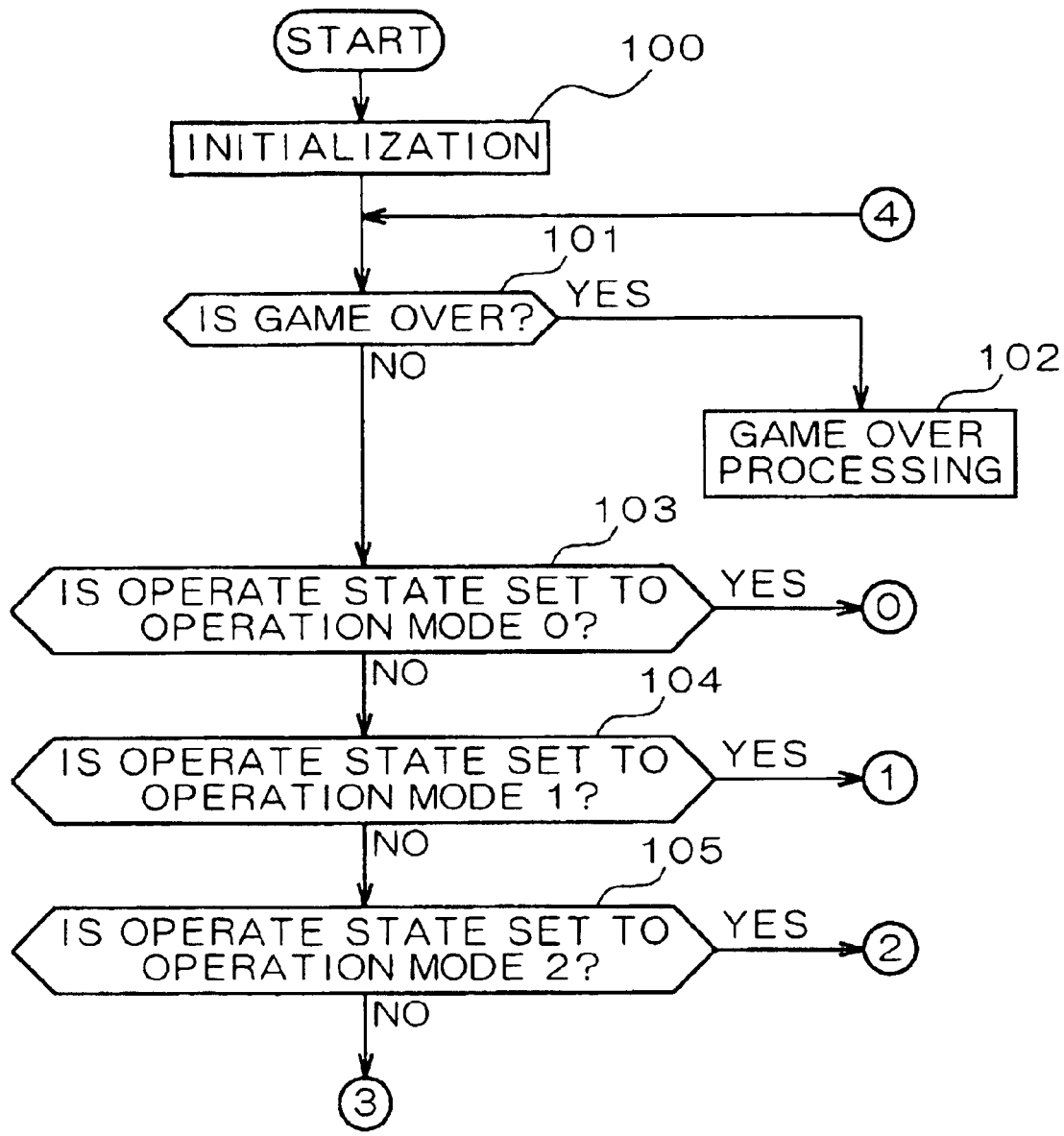
FIG. 5 is a flowchart showing operational procedure of the game machine according to this embodiment.

If the affirmative determination is performed in the determination at the step 103 shown in FIG. 5 corresponding to the "operation mode 0," the movement processing section 124 performs the processing of moving a player's viewpoint (step 200) toward the next performance position. Furthermore, the game direction section 130 determines whether the movement processing by the movement processing section 124 is finished (step 201). If the movement processing is not finished, negative determination is performed. While maintaining the operating state corresponding to this "operation mode 0," the program returns at the step 101 shown in FIG. 5 (determination of whether the game is over) and repeats processing. In addition, when the process arrives at the next branch position by, for example, movement processing by the movement processing section 124 and this movement processing is finished, the affirmative determination is performed in the determination at the above-described step 201. After an operating state is changed to the "operation mode 1" by the game direction section 130 (step 202), the process returns at the step 101 shown in FIG. 5 and the processing is repeated.

Operation corresponding to "operation mode 1"

Figure 6:
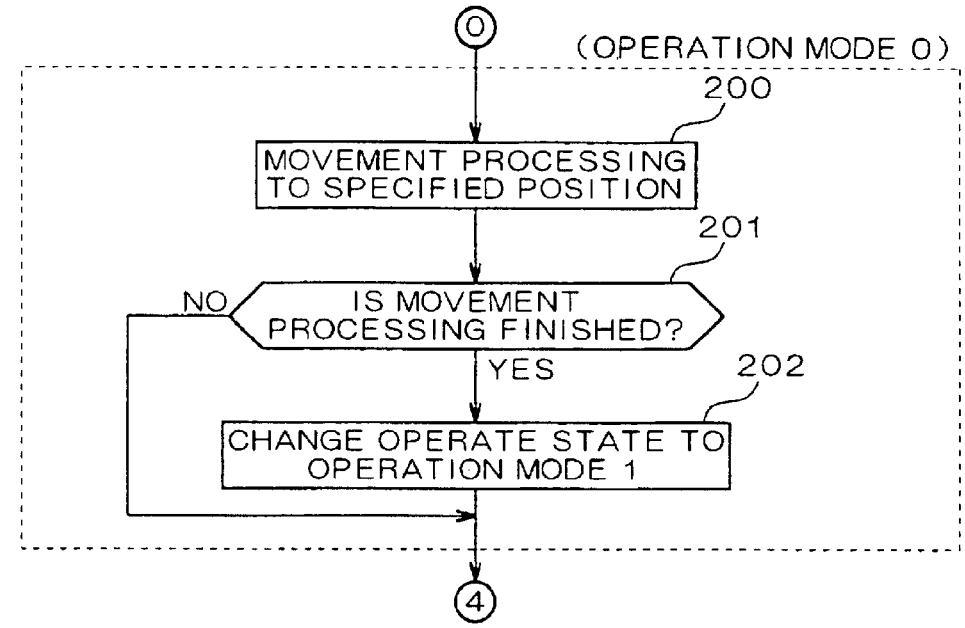
FIG. 6 is a flowchart showing operational procedure of the game machine according to this embodiment.

If the affirmative determination is performed in the determination at step 104 shown in FIG. 5 after an operating state is set in the "operation mode 1" at step 202 shown in FIG. 6, the game direction section 130 determines whether there is a player's viewpoint in a branch position during movement (step 300). This determination is performed by examining in which of the performance positions B1 and B2 shown in FIG. 3 the player's viewpoint is present after the completion of the movement. If the player's viewpoint is present in the performance position B1 or B2 shown in FIG. 3, affirmative determination is performed in determination at step 300. Next, the game direction section 130 sends an instruction of generating image data corresponding to the option marks to the image preparation section 132. Hence, the option marks S1 and S2 shown in FIG. 4 are displayed in a predetermined position on the display screen of the television monitor device 200 (step 301). In addition, if there is not a branch in the performance position where the player character arrives (if negative determination is performed at the step 300), the process returns to the step 101 shown in FIG. 5 and is repeated after the operating state is changed to the "operation mode 2" by the game direction section 130 (step 304).

When the option marks are displayed, the game direction section 130 determines whether branch selection is performed by the player (step 302). Concretely, when the trigger 310 of the gun-type controller 300 is pulled in a state of the option marks being displayed, the position calculating section 120 calculates an aiming position of the gun-type controller 300 on the display screen, that is, a bullet-hit position of a virtual bullet fired from the gun-type controller 300. Then, the calculation result is inputted into the hit checking section 122. The hit checking section 122 determines whether a bullet virtually fired from the gun-type controller 300 hits the selection area on the basis of a bullet-hit position calculated by the position calculating section 120, and outputs this determination result to the game direction section 130. When detecting that the bullet fired by the gun-type controller 300 hits the selection area is detected on the basis of this determination result, the game direction section 130 performs affirmative determination in determination at the above-described step 302 with assuming that the player performs branch selection to change the operating state to the "operation mode 0" (step 303). After that, the process returns at the step 101 shown in FIG. 5 to repeat the processing. In addition, if a bullet fired by the gun-type controller 300 does not hit the selection area, that is, if the bullet is fired but hits an area except the selection area, or if the bullet is not fired because the trigger 310 of the gun-type controller 300 is not pulled, negative determination is performed in determination at the above-described step 302. Furthermore, while maintaining the operating state corresponding to the "operation mode 1," the process returns at the step 101 shown in FIG. 5 to repeat the processing.

Operation corresponding to "operation mode 2"

Figure 7:
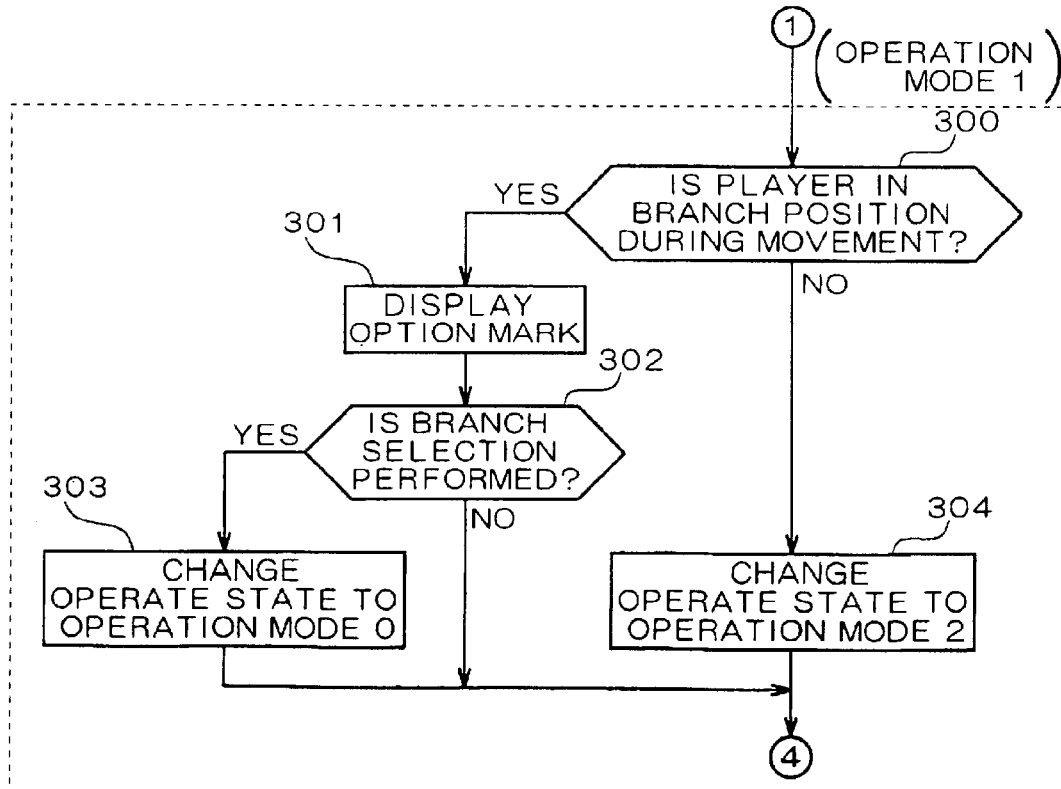
FIG. 7 is a flowchart showing operational procedure of the game machine according to this embodiment.

If the affirmative determination is performed in the determination at the step 105 shown in FIG. 5 after the operating state is set in the "operation mode 2" at the step 304 shown in FIG. 7, the operating state is transferred to an operating state corresponding to the operation mode 2. The operating state corresponding to the operation mode 2 is such an operating state that a player loads bullets in battle, and there is two kinds of operation patterns depending on whether the player can select a moving route during bullet loading. In the performance positions P2, P3, and P4 shown in FIG. 3, option marks for selecting any one of two or three moving routes from which the player can select one are displayed. Hence, the player can select desired operation between the operation of selecting a corresponding moving route by pulling the trigger 310 of the gun-type controller 300 after adjusting the sight on any one of these option marks, and the operation of accepting a challenge from the enemy character again without performing such selection operation. In addition, since there is not a moving route that can be selected in the performance positions P1 and P5 shown in FIG. 3, the option marks are not displayed. Hence, as the operation that a player can select, it is only the operation for the player to accept the challenge from the enemy character again after loading bullets.

In the operating state corresponding to the operation mode 2, first, the game direction section 130 determines whether there is a branch in the loading operation of bullets in battle (step 400). If there is a player's viewpoint in any one of the performance positions P2, P3, and P4 shown in FIG. 3, a plurality of moving routes are selectable during bullet loading. Hence, affirmative determination is performed in determination at this step 400. Next, the game direction section 130 sends an instruction of generating image data corresponding to option marks to the image preparation section 132. Hence, the option marks shown in FIG. 4 are displayed in a predetermined position on the display screen of the television monitor device 200 (step 401).

When the option marks are displayed in this manner while the player loads bullets, the game direction section 130 determines whether branch selection is performed by the player (step 402). This branch selection operation in battle is fundamentally the same as the branch selection operation performed in the movement during non-battle. Hence, the game direction section 130 can determine the presence of the branch selection on the basis of the determination result by the hit checking section 122. If the branch selection is performed, the game direction section 130 performs affirmative determination in the determination at the step 402 to change the operating state to the "operation mode 0" (step 403). After that, the process returns at the step 101 shown in FIG. 5 to repeat the processing, and movement processing for going to a performance position that becomes a next movement destination is performed.

In addition, if the branch selection is not performed in such a state that the option marks are displayed during bullet loading by a player (if negative determination is performed in the determination at the step 402), or if there is no branch during bullet loading by the player (if negative determination is performed in the determination at the step 400), the game direction section 130 next determines whether the operation should be transferred to the shooting operation after the completion of bullet loading (step 404). If the bullet loading operation is maintained, negative determination is performed, and while maintaining the operating state corresponding to the "operation mode 2," the process returns at the step 101 shown in FIG. 5 to repeat the processing.

Furthermore, if the player performs the operation of finishing the bullet loading operation and transferring to the shooting operation, affirmative determination is performed in the determination at the step 404. After the operating state is changed to the "operation mode 3" by the game direction section 130 (step 405), the process returns at the step 101 shown in FIG. 5 and the processing is repeated.

Operation corresponding to "operation mode 3"

Figure 8:
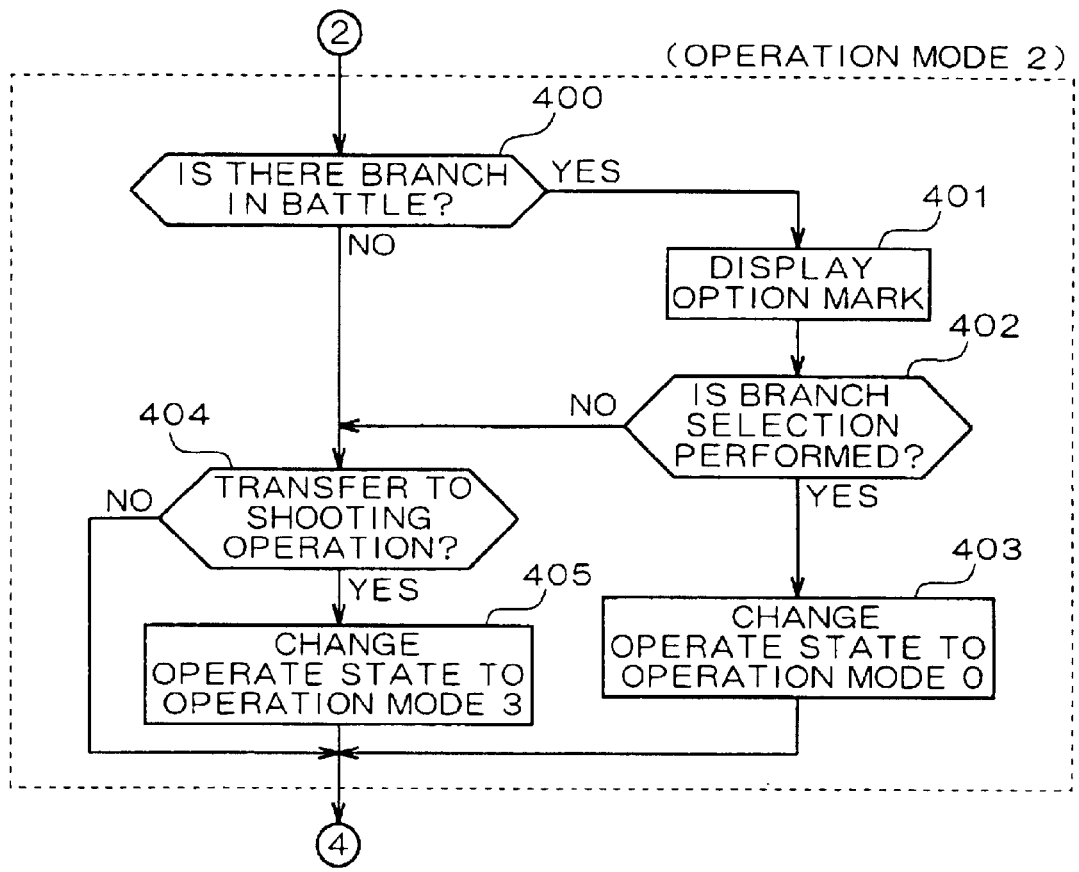
FIG. 8 a flowchart showing operational procedure of the game machine according to this embodiment.
Figure 9:
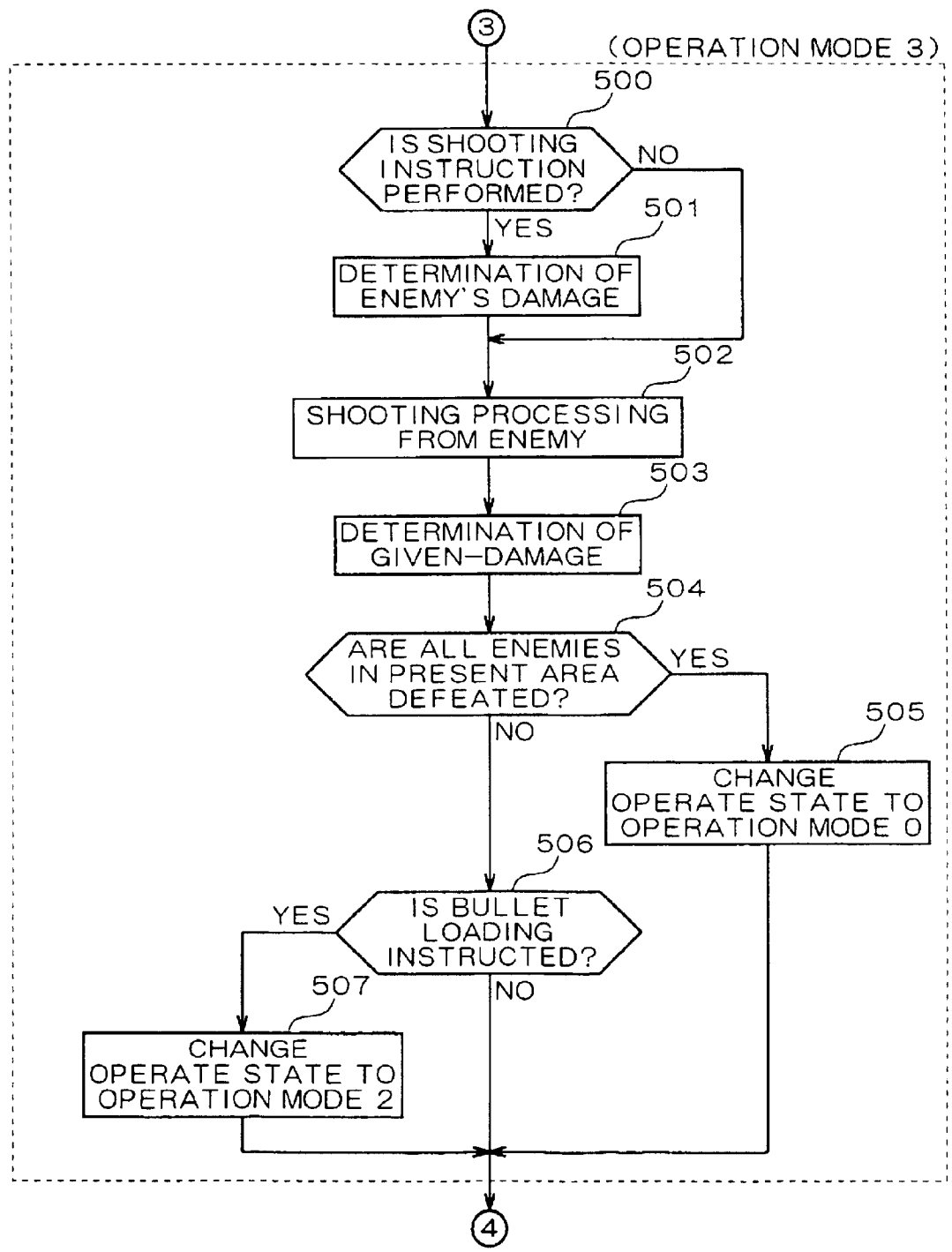
FIG. 9 a flowchart showing operational procedure of the game machine according to this embodiment.

If negative determination is performed in each determination at the steps 101, and 103 to 105 shown in FIG. 5 after the operating state is set in the "operation mode 3" at the step 405 shown in FIG. 8, the operating state transfers to an operating state corresponding to the operation mode 3.

In the operating state corresponding to the operation mode 3, first, the game direction section 130 determines whether the player pulls the trigger 310 of the gun-type controller 300 and shooting instruction is performed (step 500). If the shooting instruction is performed, affirmative determination is performed. Next, the game direction section 130 determines whether a bullet fired according to the shooting instruction by the player hits an enemy character (determination of the enemy's damage) (step 501). Concretely, the position calculating section 120 calculates a bullet-hit position on the display screen. The hit checking section 122 determines whether a bullet virtually fired from the gun-type controller 300 hits a shooting area on the basis of this bullet-hit position. If hit determination is performed, the game direction section 130 performs such performance that the enemy character on the display screen falls down and disappears.

If the shooting instruction is not performed by the player after the enemy damage determination is finished, negative determination is performed in the determination at the step 500, then the game direction section 130 performs not only the game performance of attack operation of shooting toward the player's viewpoint from the enemy character (step 502), but also the determination of whether this attack hits the player (determination of the given-damage) (step 503). Furthermore, in the shooting game according to this embodiment, actually, a player's viewpoint is just set, and such a character that the player operates is not arranged on the display screen. Hence, if an attack of enemy character hits a predetermined area including a player's viewpoint, bad mark processing of a life point or the like is performed as assumed that the player is hit.

Next, the game direction section 130 determines whether the player defeats all the enemies included in the area corresponding to a current performance position (step 504). If all the enemies are defeated, affirmative determination is performed, and the game direction section 130 changes the operating state to the "operation mode 0" (step 505). After that, the process returns at the step 101 shown in FIG. 5 to repeat the processing.

In addition, if the enemy who is not defeated in the area corresponding to the current performance position yet stays, negative determination is performed in the determination at the step 504. Next, the game direction section 130 determines whether the player performs operation instruction of bullet loading (step 506). If the player does not perform this operation instruction, the process returns at the step 101 shown in FIG. 5 to repeat the processing, while maintaining the operating state corresponding to the "operation mode 3." On the other hand, affirmative determination is performed in determination at step 506 if the player performs the operation instruction of bullet loading, and after an operating state is changed to the "operation mode 2" (step 507), the process returns at the step 101 shown in FIG. 5 and the processing is repeated.

In this manner, in the game machine according to this embodiment, when a viewpoint corresponding to a player is moved along a predetermined moving route in a game space, option marks are displayed in a performance position with a branch. By hitting this with the gun-type controller 300, it is possible for the player himself/herself to select a desired route among the routes from which the player can freely select one route, and hence it is possible to give variations on the progress of the game. In addition, since it is possible to perform selection operation of a moving route and shooting operation in battle with an enemy character or the like by only the gun-type controller 300, it is possible to enhance operability by simplifying operation.

Furthermore, in each of the three performance positions P2 to P4 included in the block b shown in FIG. 3, bi-directional movement is possible, and hence, it is possible to repeatedly enjoy the performance of the game in the same performance position. Hence, it is possible to quite uniquely enjoy the game.

Figure 10:
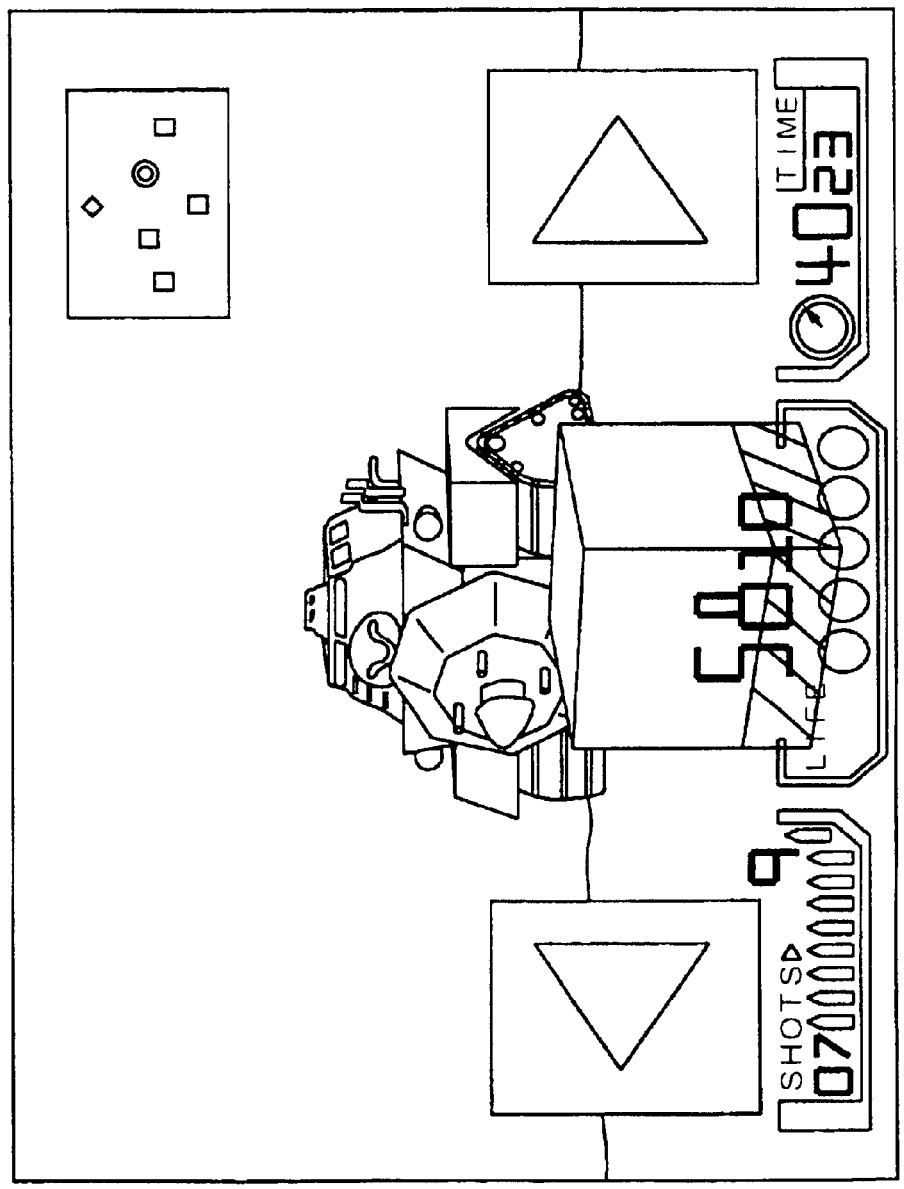
FIG. 10 is a schematic diagram showing a display example of another game screen corresponding to another performance position.
Figure 11:
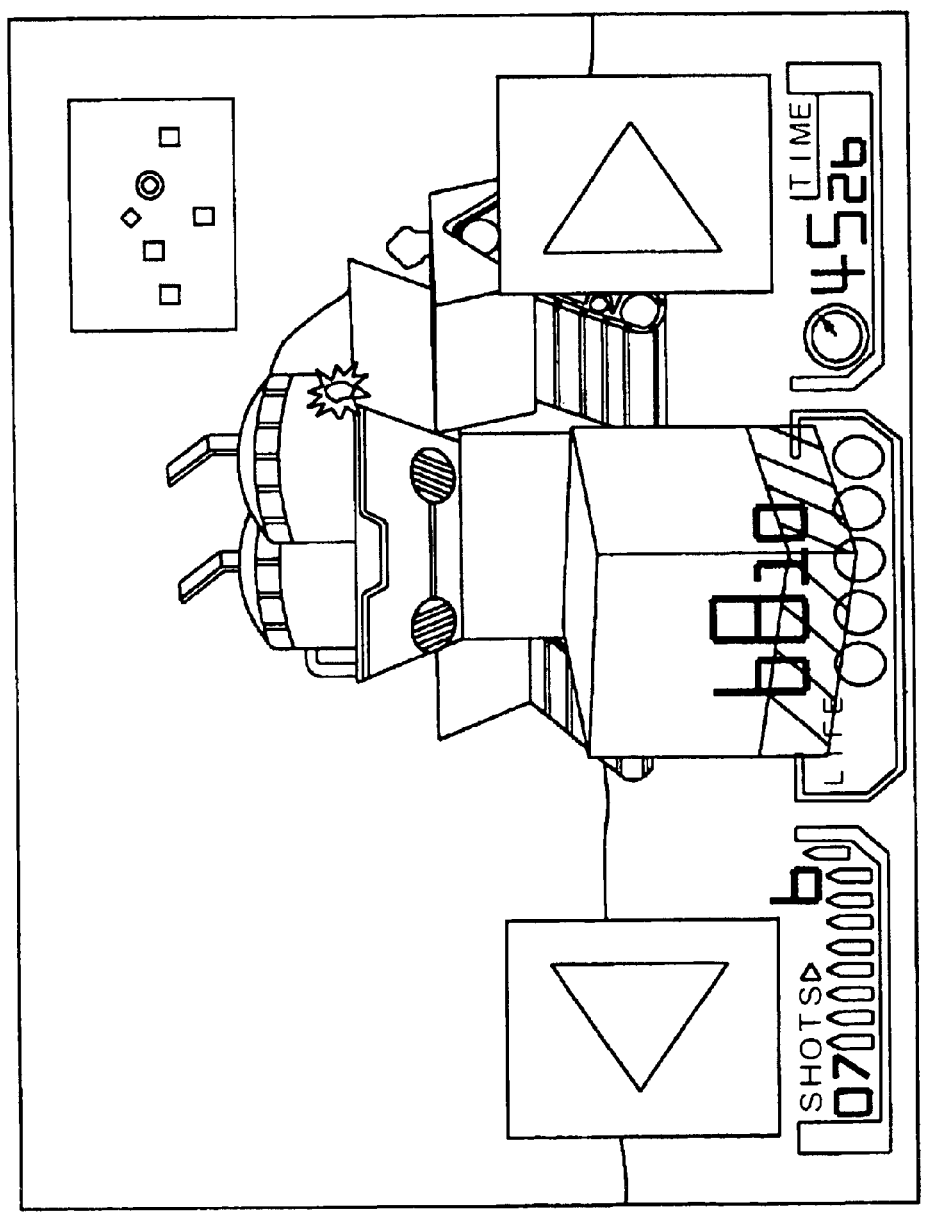
FIG. 11 is a schematic diagram showing a display example of still another game screen corresponding to still another performance position.
Figure 12:
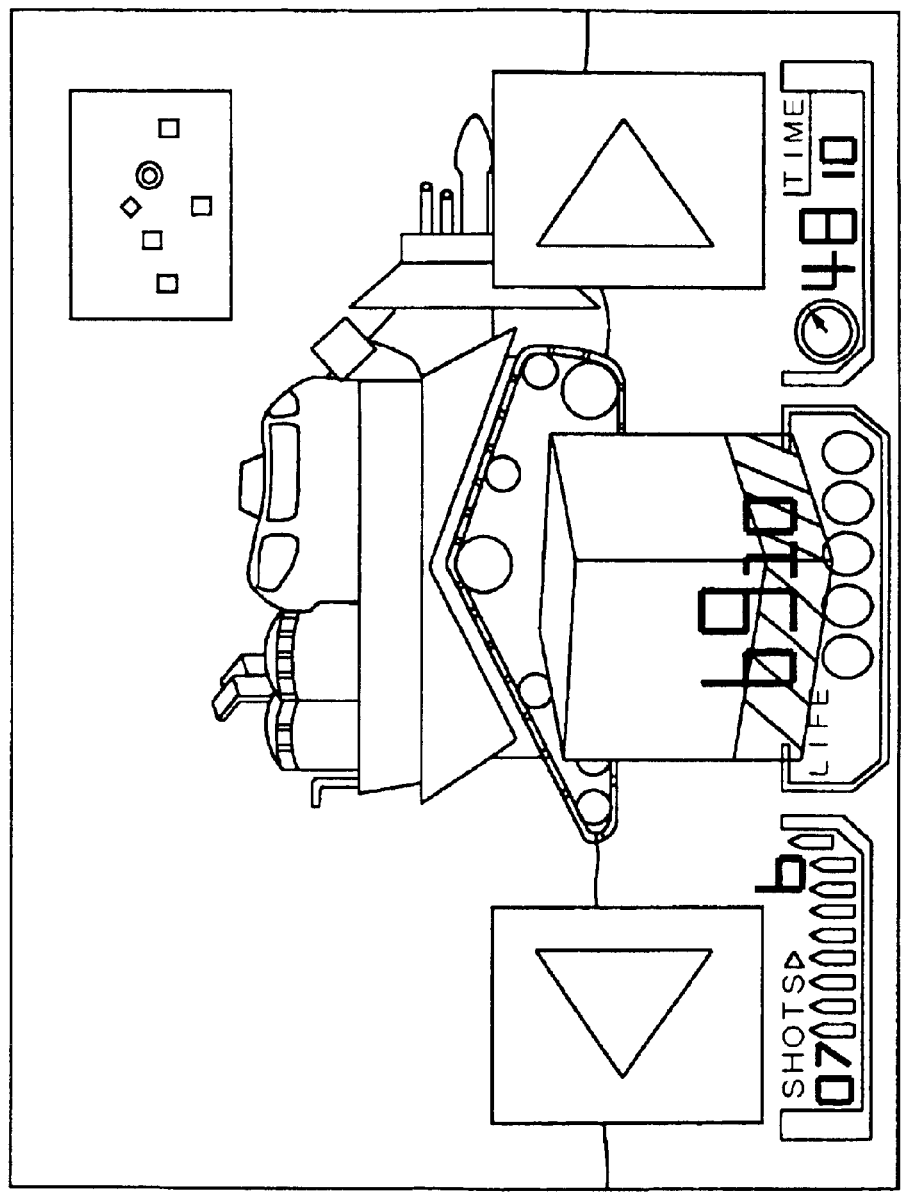
FIG. 12 is a schematic diagram showing a display example of a further game screen corresponding to a further performance position.
Figure 13:
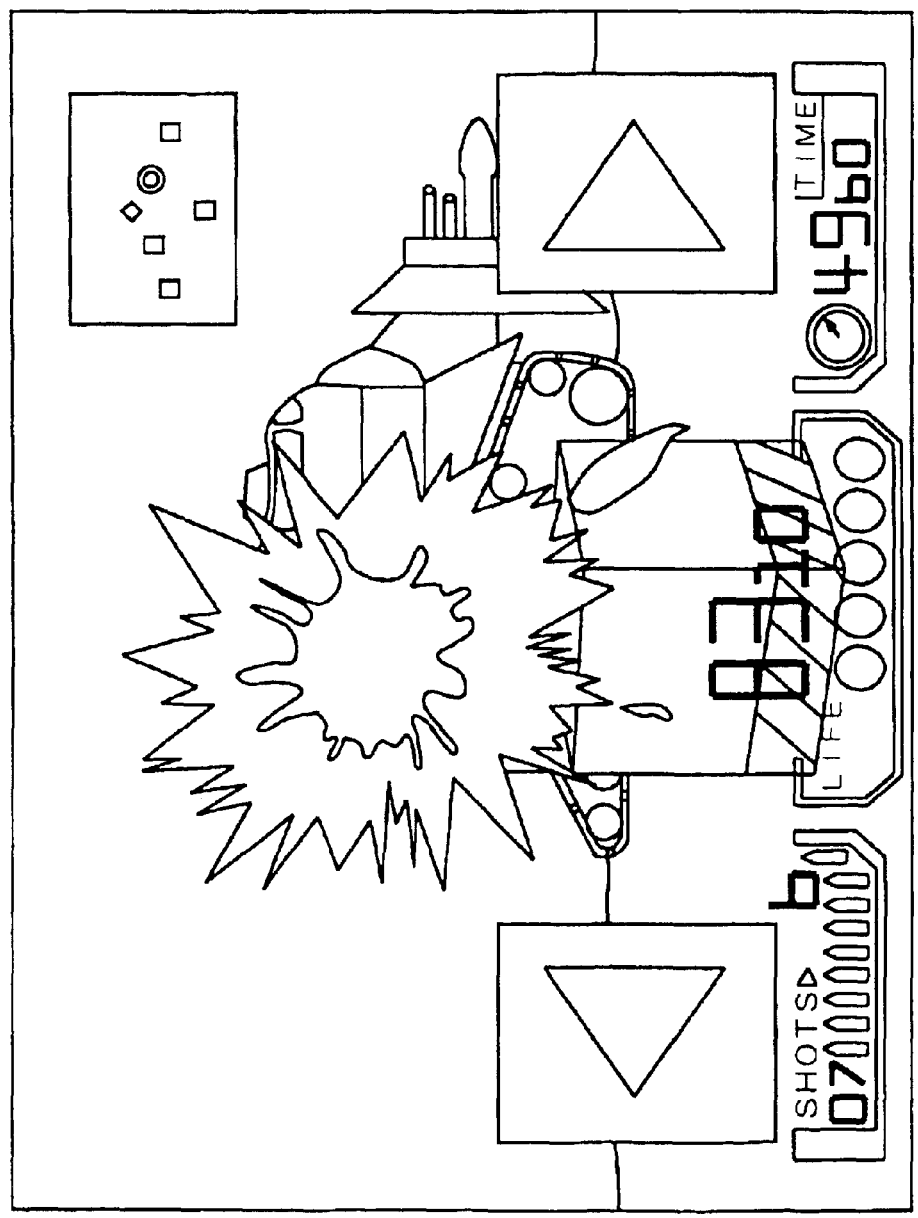
FIG. 13 is a schematic diagram showing a display example of a sill further game screen corresponding to a still further performance position.

For example, let a performance position corresponding to a display example shown in FIG. 10 be P2, a performance position corresponding to a display example shown in FIG. 11 be P3, and a performance position corresponding to a display example shown in FIG. 12 be P4. Thus, a front position of a tank as an enemy character corresponds to the performance position P2, and rear and side positions of the tank correspond to the performance positions P3 and P4. In this manner, by setting a plurality of performance positions like enclosing an enemy character, it becomes possible that a player looks for a weak point of the enemy character. Only when the player finds this weak point, as shown in FIG. 13, it becomes possible to perform such performance that the player can defeat the enemy character. As described above, it gives variations on the game contents that a player can freely go back and forth within the block b, and hence, it is possible to enjoy the game development that is impossible up to now.

Moreover, as shown in FIG. 4, by adopting a triangular mark suggesting the direction of the next moving route as an option mark, it is possible for a player to selects a moving direction so that game development is advantageous to the player and to enjoy game development aimed by himself/herself. Therefore, it is possible to give variations on the game contents.

Furthermore, in battle, only when a bullet is loaded, that is, under the condition of not being attacked from an enemy character, the option marks are displayed. Hence, the player need not perform the selection operation of a moving route in battle with the enemy character, and hence the player can enjoy the game with concentrating shooting operation like a conventional way. Therefore, it is possible to prevent the operation from becoming complicated as a case of performing the shooting operation and selection operation simultaneously. In addition, since the game operation section 110 need not process the game calculation in battle, the display of selection marks, and the selection determination of them simultaneously, it is possible to prevent a processing load from increasing.

Figure 14:
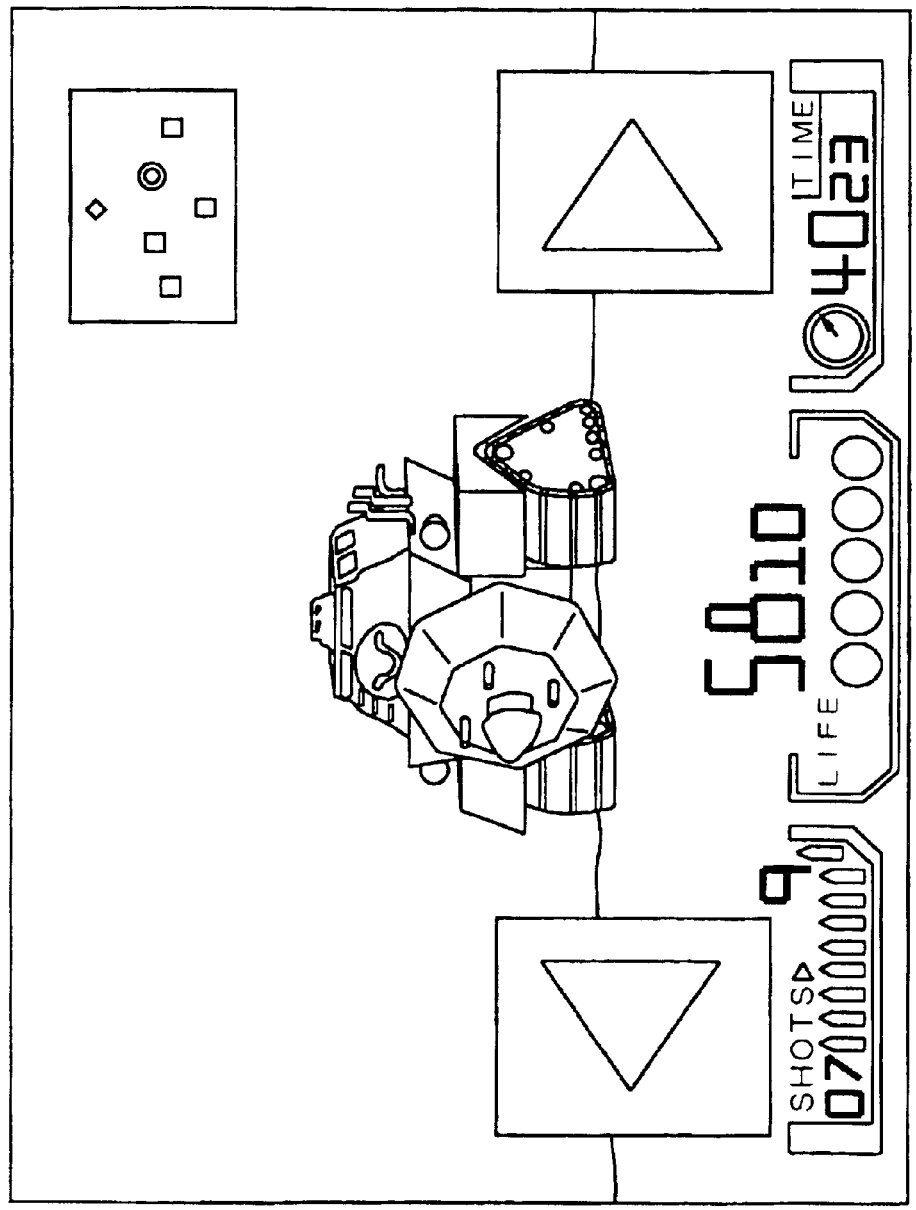
FIG. 14 is a schematic diagram showing a display example of a game screen where a moving route is selected in battle.

The present invention is not limited to above-described embodiments, but various kinds of modification can be formed within a scope of the gist of the present invention. For example, in the above-described embodiment, as shown in FIG. 4 and the like, in battle with an enemy character, option marks are displayed only when bullet loading operation is performed, and hence a player can change a moving route. Nevertheless, as shown in FIG. 14, a moving route can be selected in the situation of bullets flying about both sides by displaying the option marks under the condition of being attacked from the enemy. Since it is possible to increase a degree of difficulty of operation instruction by a player by adding such an operation mode, it is possible to give variations on the game contents.

In addition, in the above-described embodiment, as described with using FIGS. 11, 12, and 13, it becomes possible to perform such game performance that a player can attack an enemy character who is common to a plurality of performance positions P2 to P4. In this case, it is desirable not to perform the determination (bullet-hit determination) of whether a bullet and the like hit the virtual player character even if the player character is attacked in movement between respective performance positions. Since the movement of a viewpoint between respective performance positions is performed automatically by the movement processing section 124, a player cannot avoid a bullet fired from an enemy character. Therefore, since the game lacks in interest if the player is hit in this timing, it is possible to avoid such an inconvenience by not performing the bullet-hit determination. However, in case the player battles with a boss character, so as to give variations on the game contents, it can be also made that the player character is attacked from the enemy character in movement.

Furthermore, in the above-described embodiment, the direction of a route to which the player character next moves is suggested by making a shape of the option mark a triangular mark or an arrow mark. For example, shapes of the option marks can be also devised so that the player can be informed of a degree of difficulty of the game corresponding to the next movement destination. For example, since a player can easily understand the degree of difficulty by classifying the option marks by color according to the degree of difficulty, the player can take the degree of difficulty into account when selecting a moving route. Hence, the player can enjoy the game contents that fit his/her own capability.

Figure 15:
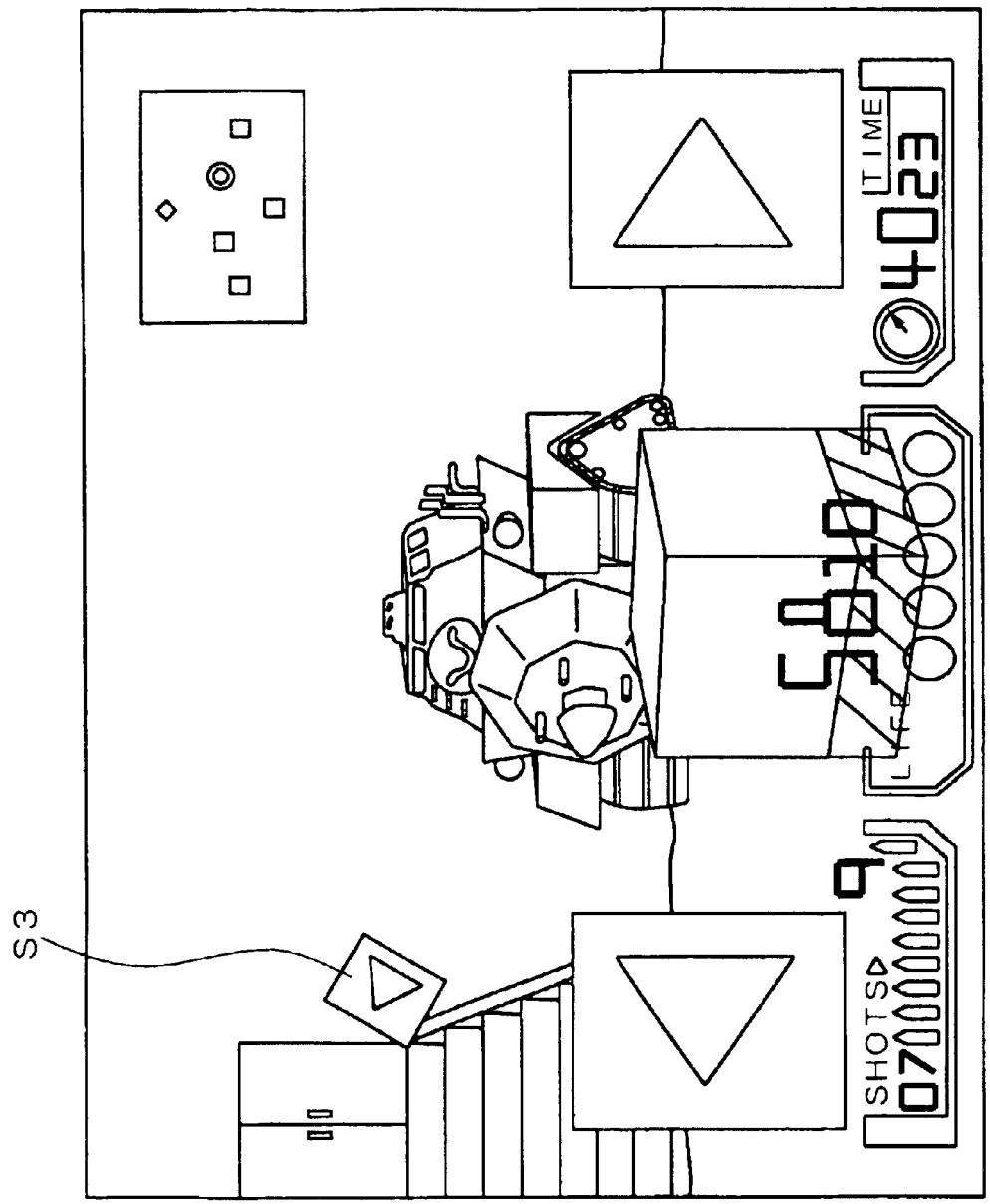
FIG. 15 is a schematic diagram showing a display example of a game screen where a display position is changed.

In addition, in the above-described embodiment, a case that the option marks are displayed in two places of right and left sides of a display screen is described. Nevertheless, so long as it is in a game space, the option marks can be also displayed in arbitrary positions within the display screen. For example, as shown in FIG. 15, steps appear in a left anterior side in view of a player's viewpoint, and a door is provided upstairs. In this situation, an option mark S3 can be displayed near the door. Thereby a route for escaping through the door can be selected by the player, near this door as one of the moving route.

Furthermore, in the above-described embodiment, as shown in FIG. 3, a case that one block b is included on the way of the process of a game is described, but a plurality of blocks like this can be included. For example, as shown in FIG. 16, three blocks b1, b2, and b3 are included on the way of the process of the game. A player character can perform bi-directional movement between performance positions or circular movement in each block, and can perform movement in only one direction between respective blocks.

In addition, although a home video game machine is described in the above-described embodiment, the present invention can be also applied to a game machine for business-use installed in an amusement center and the like. Furthermore, although a case of using the gun-type controller 300 as a pointing device is described as an example, other pointing device can be used.

Moreover, in the above-described embodiment, although an aiming position on a display screen is detected by combining the raster scan type display 210 composed of a CRT and the like with the gun-type controller 300 having the photoreceiver 320, the combination of realizing this detection mechanism is not limited to this. For example, if a position and a direction of a muzzle can be directly detected by attaching a position sensor, an angle sensor, and the like to a gun-type controller, it is also possible to realize the display 210 with using a liquid crystal display or a liquid crystal projector which do not perform raster scan. In addition, an aiming position of a gun-type controller can be also detected by providing an infrared emission section and the like on the gun-type controller, taking a photograph of a irradiation point on a screen with photograph unit such as a CCD camera, and analyzing an image photographed.

Furthermore, the above embodiment describes the CD-ROM 188 as the information storage medium storing a game program, but a DVD-ROM, ROM cartridge, hard disk or data cartridge using a tape medium, etc. can also be used instead. In this case, a data reading section compatible with each information storage medium can be provided instead of the disk reading section 186.

What is claimed is:

1. A game machine, wherein a plurality of performance positions in a three-dimensional space where a game performance corresponding to a player's operation instruction is performed, and a plurality of moving routes interconnecting the plurality of performance positions are set, and the game machine comprising:

movement processing unit for moving a viewpoint corresponding to the player along said moving routes;

selection image display unit for displaying predetermined option images corresponding to the moving routes where the viewpoint can next move, in the performance positions; and a pointing device for selecting any one of said option images displayed by said selection image display unit, a game directing unit for performing shooting calculation for battling with a virtual enemy with using said pointing device in said performance positions, wherein said selection image display unit displays said option images under a condition of not being attacked from said virtual enemy.

2. The game machine according to claim 1, wherein said game directing unit does not execute bullet-hit determination for a bullet fired from said virtual enemy during movement of said viewpoint along said moving route.

3. A game machine, wherein a plurality of performance positions in a three-dimensional space where a game performance corresponding to a player's operation instruction is performed, and a plurality of moving routes interconnecting the plurality of performance positions are set, and the game machine comprising:

movement processing unit for moving a viewpoint corresponding to the player along said moving routes;

selection image display unit for displaying predetermined option images corresponding to the moving routes where the viewpoint can next move, in the performance positions; and a pointing device for selecting any one of said option images displayed by said selection image display unit, wherein said option image displays distinguish a degree of difficulty in the next performance position that is a movement destination, a game directing unit for performing shooting calculation for battling with a virtual enemy with using said pointing device in said performance positions, wherein said selection image display unit displays said option images under a condition of not being attacked from said virtual enemy.

4. The game machine according to claim 3, wherein said game directing unit does not execute bullet-hit determination for a bullet fired from said virtual enemy during movement of said viewpoint along said moving route.

5. A game machine, wherein a plurality of performance positions in a three-dimensional space where a game performance corresponding to a player's operation instruction is performed, and a plurality of moving routes interconnecting the plurality of performance positions are set, and the game machine comprising:

movement processing unit for moving a viewpoint corresponding to the player along said moving routes;

selection image display unit for displaying predetermined option images corresponding to the moving routes where the viewpoint can next move, in the performance positions; and a pointing device for selecting any one of said option images displayed by said selection image display unit, wherein said option image is displayed at a position suggesting a movable direction on a display, a game directing unit for performing shooting calculation for battling with a virtual enemy with using said pointing device in said performance positions, wherein said selection image display unit displays said option images under a condition of not being attacked from said virtual enemy.

6. The game machine according to claim 5, wherein said game directing unit does not execute bullet-hit determination for a bullet fired from said virtual enemy during movement of said viewpoint along said moving route.

* * * * *